Dec. 16, 1930.  G. W. BLACKINTON  1,785,510
SHOCK ABSORBER
Filed April 26, 1929
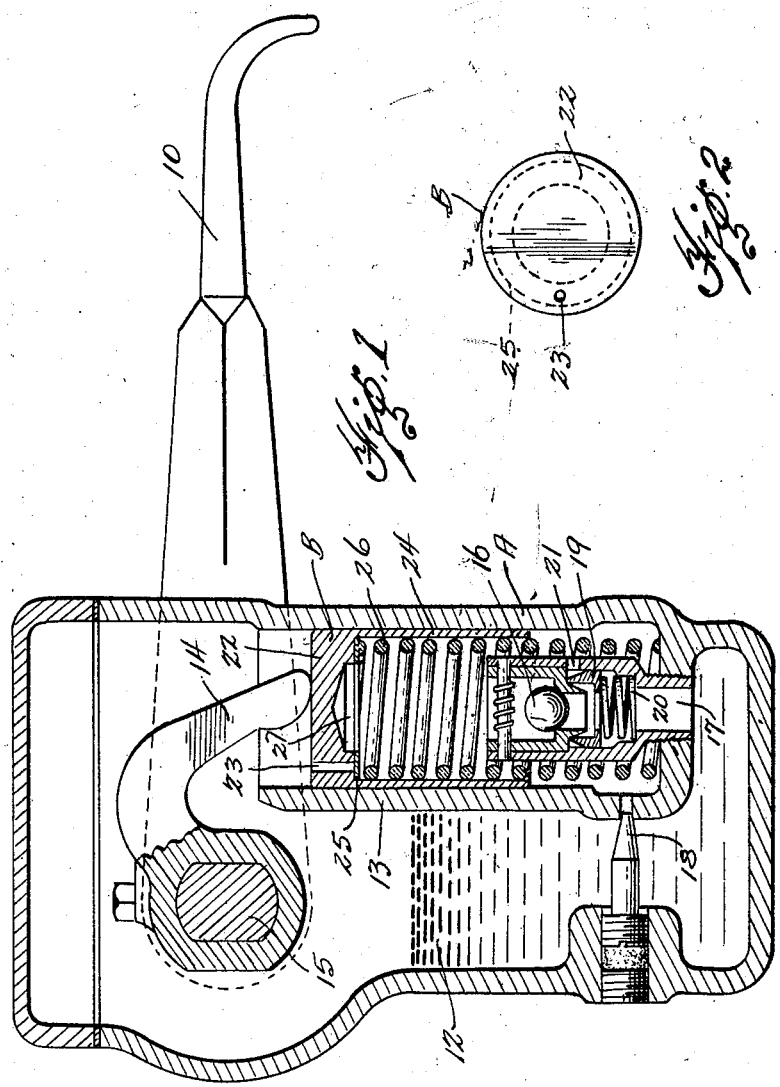
INVENTOR.
George W. Blackinton
BY
ATTORNEY.

Patented Dec. 16, 1930

1,785,510

UNITED STATES PATENT OFFICE

GEORGE W. BLACKINTON, OF DETROIT, MICHIGAN, ASSIGNOR TO CONTINENTAL MOTORS CORPORATION, OF DETROIT, MICHIGAN, A CORPORATION OF VIRGINIA

SHOCK ABSORBER

Application filed April 26, 1929. Serial No. 358,184.

This invention relates to shock absorbers of the hydraulic type and is particularly adapted for use in connection with motor vehicles.

At the present time considerable difficulty is experienced with hydraulic shock absorbers owing to a tendency for the piston to accumulate air. Thus the oil becomes emulsified and air bubbles carried into the pressure cylinder where they tend to accumulate beneath the piston. This excess air impairs efficient operation of the shock absorber and it is an object of my invention to provide a novel piston vent which will readily permit escape of air from the pressure cylinder and at the same time also prevent escape of oil through the vent. A further important object of my invention resides in providing a piston vent of extremely simple construction capable of manufacture and assembly at very low cost as compared with other piston vents heretofore used.

Referring to the accompanying drawings which illustrate one embodiment of my invention, Fig. 1 is a sectional elevation view of my shock absorber, and Fig. 2 is a top plan view of the piston.

In the drawings reference character A represents the shock absorber casing usually secured to the vehicle axle while the actuating arm 10 is usually connected to move with the axle as will be readily understood. The shock absorber illustrated is of the one way type in which resistance to movement of arm 10 is encountered in only one direction corresponding to the vehicle rebound although my invention can be used to equal advantage in the two-way shock absorber.

Casing A has a fluid chamber 12 and pressure chamber formed by cylinder 13. The fluid is placed under pressure in cylinder 13 by piston B actuated by lever 14 moved with rock-shaft 15 by the arm 10. Any suitable and desired valving means may be utilized between chamber 12 and cylinder 13. In the illustration the fluid is freely passed to cylinder 13 on upward movement of piston B, the ball check valve 16 admitting the fluid from port 17. On the downward movement of the piston fluid pressure is developed in cylinder 13, this pressure being controlled for relief depending on the desired characteristics of resistance. Thus an adjustable seepage valve 18 may be provided in the wall of cylinder 13 and excess pressure may be relieved by sleeve valve 19 depressing spring 20 so as to pass fluid from port 21 through port 17. As stated before my invention is not dependent on any particular arrangement and construction of valve or valves.

The piston B has a head 22 provided with a port or passageway 23 extending therethrough. The piston B has skirt 24 guiding the movement of the piston in cylinder 13. Beneath the piston head is a disc or washer 25 which covers the inner terminus of port 23 being held in such position by spring 26 which constantly tends to urge the piston B and arm 10 upwardly. The piston head 22 may in some instances be bored out to provide an air trap 27 where it is desired to trap a definite small quantity of air beneath the piston for facilitating the "free center" movement of the piston, any excess air being readily vented past disc 25 and upwardly through port 23. I have found that the disc 25 prevents escape of oil from the cylinder 13 through port 23 although air accumulations will be readily vented, the mere contact of disc 25 with port 23 not being sufficient to hold the air beneath the piston.

It has heretofore been proposed to vent the piston head with a very small opening to permit air escape without undue escape of oil but this requires objectionable small drilling which is very undesirable in quantity production. It has also been proposed to provide a large piston vent and provide a valve in the vent for controlling the air escape but here again such structure is costly and not susceptible to easy and cheap production. I have provided a piston which may have a relatively large diameter vent 23, together with disc 25 which merely seats against the vent opening to permit the escape of air accumulations and to prevent escape of oil.

What I claim as my invention is:

1. A shock absorber of the hydraulic type comprising a casing having a pressure chamber, a piston adapted to be actuated by one of two relatively movable parts, valve means controlling relief of pressure developed in the pressure chamber by movements of the piston, said piston provided with a passageway therethrough, and means closing said passageway against the substantial escape of liquid therethrough from the pressure chamber but permitting escape of air accumulations from the pressure chamber.

2. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and means held immovable relatively to the piston but movable therewith closing said passageway against the substantial escape of liquid therethrough from the pressure chamber but permitting escape of air accumulations from the pressure chamber.

3. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and a disc closing said passageway against the substantial escape of liquid therethrough from the pressure chamber but permitting escape of air accumulations from the pressure chamber.

4. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and means engaging the head of the piston for closing said passageway against the substantial escape of liquid therethrough from the pressure chamber but permitting escape of air accumulations from the pressure chamber.

5. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and means within the pressure chamber closing said passageway against the substantial escape of liquid therethrough from the pressure chamber but permitting escape of air accumulations from the pressure chamber.

6. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and means engaging the head of the piston and within the pressure chamber closing said passageway against the substantial escape of liquid therethrough from the pressure chamber but permitting escape of air accumulations from the pressure chamber.

7. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, and means closing said passageway against the substantial escape of liquid therethrough from the pressure chamber but permitting escape of air accumulations from the pressure chamber, and a spring holding said passageway closing means in position.

8. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, means closing said passageway against the substantial escape of liquid therethrough from the pressure chamber but permitting escape of air accumulations from the pressure chamber, and a spring holding said passageway closing means in position and also serving to urge the piston in one direction of its movement.

9. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, a disc closing the passageway against the substantial escape of liquid therethrough from the pressure chamber but permitting escape of air accumulations from the chamber, and a spring engaging the disc for yieldingly urging the disc and piston as a unit in one direction of the piston movement.

10. A shock absorber of the hydraulic type comprising a casing having a pressure chamber, a piston adapted to be actuated by one of two relatively movable parts, valve means controlling relief of pressure developed in the pressure chamber by movement of the piston, said piston provided with a passageway therethrough, means engaging the head of the piston and within the pressure chamber closing said passageway against the substantial escape of liquid therethrough from the pressure chamber but permitting escape of air accumulations from the pressure chamber, and a spring within the pressure chamber engaging the passageway closing means.

11. A shock absorber of the hydraulic type comprising a pressure chamber, a piston movable therein, valve means controlling relief of pressure developed by the piston, said piston having a port therethrough separate from the pressure relief means, and an element positioned across the port.

12. A shock absorber of the hydraulic type comprising a pressure chamber, a piston movable therein, valve means controlling relief of pressure developed by the piston, said piston having a port therethrough, and a disc beneath the piston head in engagement with said port.

13. A shock absorber of the hydraulic type comprising a pressure chamber, a piston movable therein valve means controlling relief of pressure developed by the piston, said piston having a port therethrough and a disc engaging the port and a piston actuating spring seating the disc against the port.

14. A shock absorber of the hydraulic type comprising a pressure chamber, a piston movable therein, valve means controlling relief of pressure developed by the piston, said piston provided with an air chamber on the inner side of the head of the piston, a port through the piston head adjacent said air chamber, and a disc closing said port against the substantial escape of oil therethrough.

15. A shock absorber of the hydraulic type comprising a pressure chamber, a piston movable therein valve means controlling relief of pressure developed by the piston, said piston provided with an air chamber on the inner side of the head of the piston, a port through the piston head adjacent said air chamber, and a disc closing said port against the substantial escape of oil therethrough, and a spring maintaining the disc in position and also urging the piston in one direction of its movement.

In wtness whereof, I hereunto subscribe my name this 24 day of April, 1929.

GEORGE W. BLACKINTON.